United States Patent [19]
Chang et al.

[11] Patent Number: 5,271,920
[45] Date of Patent: Dec. 21, 1993

[54] ACTIVATION OF ZEOLITES

[75] Inventors: Clarence D. Chang, Princeton; Nai Y. Chen, Titusville; Cynthis T. Chu, Princeton Junction; Bruce P. Pelrine, Trenton, all of N.J.

[73] Assignee: Mobil Oil Corporation, Fairfax, Va.

[21] Appl. No.: 818,722

[22] Filed: Jan. 7, 1992

Related U.S. Application Data

[63] Continuation of Ser. No. 273,544, Nov. 21, 1988, abandoned.

[51] Int. Cl.$^5$ .............................................. C01B 33/34
[52] U.S. Cl. .......................... 423/700; 423/DIG. 22; 502/77; 502/85
[58] Field of Search ............... 423/328, 329, 330, 306, 423/700, DIG. 22; 502/71, 77, 85

[56] References Cited

U.S. PATENT DOCUMENTS

| | | | |
|---|---|---|---|
| 3,926,782 | 12/1975 | Plank et al. | 208/111 |
| 4,101,595 | 7/1978 | Chen et al. | 585/321 |
| 4,477,582 | 10/1984 | Miale | 502/26 |
| 4,478,950 | 10/1984 | Chu | 423/328 |
| 4,550,092 | 10/1985 | Chang et al. | 502/85 |
| 4,559,315 | 12/1985 | Chang et al. | 502/71 |
| 4,594,333 | 6/1986 | Chang et al. | 502/85 |
| 4,605,637 | 8/1986 | Chang et al. | 423/328 |
| 4,678,763 | 7/1987 | Chang et al. | 502/85 |
| 4,863,885 | 9/1989 | Degnan Jr. | 423/328 |

Primary Examiner—R. Bruce Breneman
Attorney, Agent, or Firm—Alexander J. McKillop; Malcolm D. Keen; Marina V. Schneller

[57] ABSTRACT

The invention includes a ZSM-5 composition and the preparation thereof which comprises treating ZSM-5 with solutions of salts of weak acids. The resulting ultrasmall crystal size ZSM-5 component has a sorption capacity for 2,2-dimethylbutane of at least 10 mg/g zeolite and a sorption time for 30% capacity zeolitic sorption at 60° C. and P(2,2-dimethylbutane) of 60 torr, of less than about 4 minutes.

14 Claims, 3 Drawing Sheets

2,2-DIMETHYLBUTANE SORPTION BY B-TYPE AND CARBONATE TREATED ZSM-5.

ACTIVATION OF ZEOLITES

This is a continuation of U.S. application Ser. No. 07/273,544, filed Nov. 21, 1988, now abandoned.

FIELD OF THE INVENTION

The invention is directed to the modification of medium pore zeolites, and to the product produced thereby. Modification of the zeolite composition and crystal size affects activity and selectivity of catalyst performance and stability properties thereof. Catalyst compositions comprising those zeolites are used for various hydrocarbon conversions and synthetic organic reactions.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by unit structure of the crystal. The zeolites are referred to as "molecular sieves" because the uniform pore size of a zeolite material may allow it to selectively absorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula

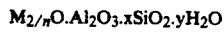

$M_{2/n}O.Al_2O_3.xSiO_2.yH_2O$

In the empirical formula, M was described therein to be sodium, potassium, magnesium, calcium, strontium and/or barium; x is equal to or greater than 2, since $AlO_4$ tetrahedra are joined only to $SiO_4$ tetrahedra, and n is the valence of the cation designated M; and the ratio of the total of silicon and aluminum atoms to oxygen atoms is 1:2. D. Breck, ZEOLITE MOLECULAR SIEVES, John Wiley & Sons, New York p. 5 (1974).

The prior art describes a variety of synthetic zeolites. These zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 U.S. Pat. No. 3,314,752); zeolite ZSM-11 (U.S. Pat. No. 3,709,979) and zeolite ZSM-23 (U.S. Pat. No. 3,076,842), merely to name a few.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-22 is described in U.S. patent application Ser. No. 373,451 filed Apr. 30, 1982, and now pending. The entire description thereof is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,375,573. Such a description includes the X-ray diffraction pattern for ZSM-48.

Zeolite beta is more particularly described in U.S. Pat. No. 3,308,069 and U.S. Pat. No. Re. 28,341.

Zeolite Y can be synthesized with an $SiO_2/Al_2O_3$ ratio up to about 5:1; in order to achieve higher ratios of $SiO_2/Al_2O_3$, various techniques have been developed to remove structural aluminum therefrom.

It is to be understood that by incorporating by reference the foregoing patents and patent applications to describe examples of specific members of the novel class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents and patent applications should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material. The crystal structure of known zeolites may include gallium, boron, iron and chromium as framework elements, without changing its identification by the X-ray diffraction "fingerprint"; and these gallium, boron, iron and chromium containing silicates and aluminosilicates may be useful, or even preferred, in some applications.

Crystalline ZSM-5 and its preparation are described in U.S. Pat. No. 3,702,886, the entire disclosure of which is incorporated herein by reference. It has a distinctive X-ray diffraction pattern which identifies it from other known crystalline silicates. A crystalline silicate composition having the structure of ZSM-5 is described in U.S. Pat. No. Re. 29,948, the entire disclosure of which is incorporated herein by reference. U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by a compound such as tetrapropylammonium bromide, triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

The silicon/aluminum atomic ratio of a given zeolite is often variable. For example, zeolite X can be synthesized with silicon/aluminum atomic ratios of from 1 to 1.5, while that ratio in zeolite Y is from 1.5 to 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871, reissued as U.S. Pat. No. Re. 29,948, discloses a porous crystalline silicate made from a reaction mixture containing no deliberately added aluminum and exhibiting the X-ray diffraction pattern characteristic of ZSM-5.

The exact chemical make-up of zeolites including ZSM-5 can determine the nature of its activity in a particular catalysis. Thus, the chemical make-up of the zeolite, in terms of its silica/alumina atomic ratio is of practical significance. These properties affect the performance of catalyst composition in, e.g. dewaxing and hydroprocessing of heavy hydrocarbons as well as in alcohol conversions to hydrocarbons (gasoline).

Many catalytic process occurring over ZSM-5, and other small and medium pore zeolites, are adversely affected by zeolitic diffusion. Controlling diffusion rates in conjunction with control of zeolite crystal size is in U.S. Pat. No. Re. 31,782 which relates to xylene isomerization. Smaller crystal size zeolites are used because of superior selectivity, steam stability and aging properties.

SUMMARY OF THE INVENTION

Figure 1:
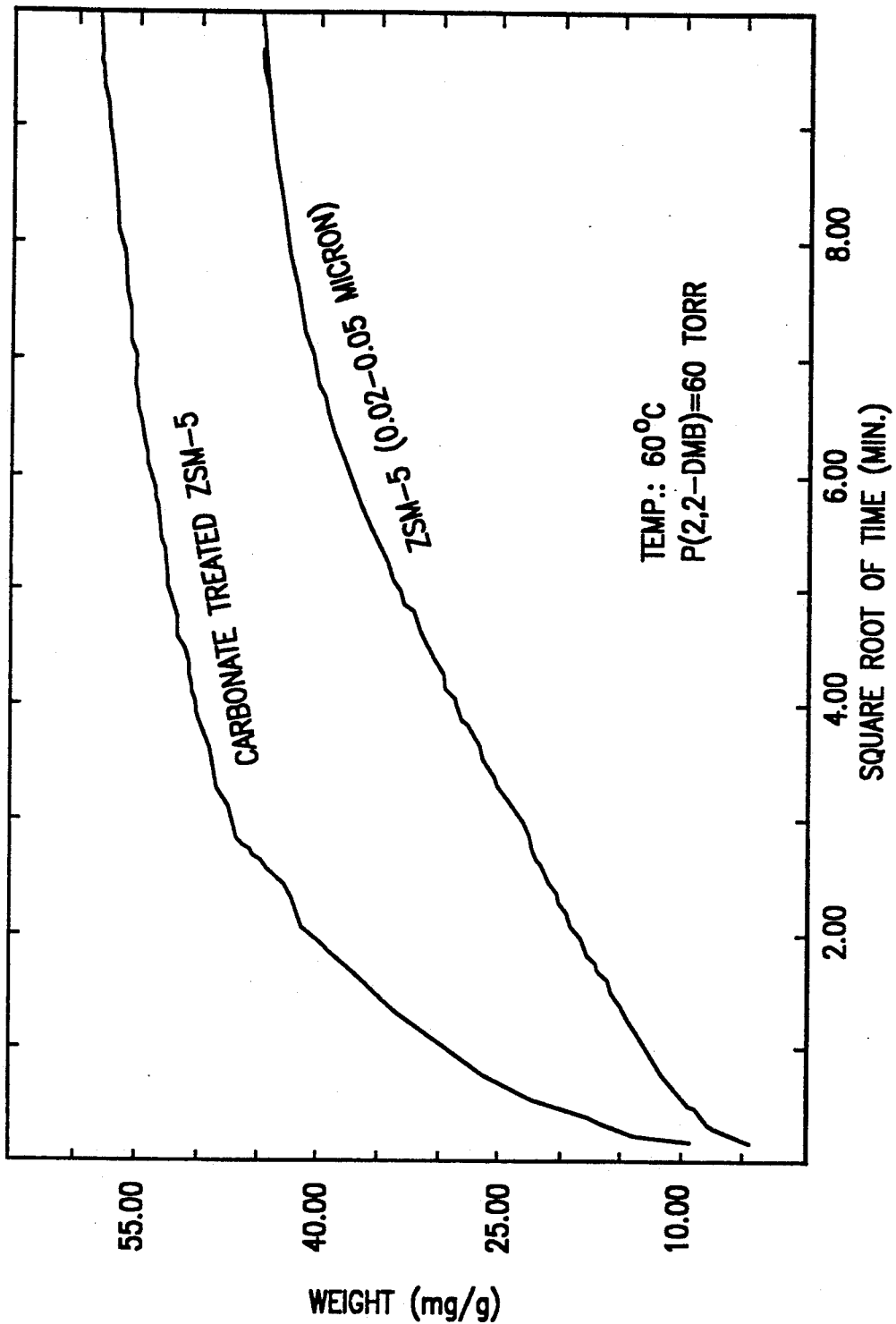
FIG. 1 is a graph of the plot of weight of 2,2-dimethylbutane sorbed vs. the square root of the time.

A ZSM-5 preparation is disclosed which is an ultrasmall crystal size ZSM-5 characterized by:

1) a sorption capacity for 2,2-dimethylbutane of at least 10 mg/g zeolite, and 2) a sorption time for 30% of capacity zeolitic sorption, at 60° C. and P(2,2-dimethylbutane) of 60 torr, of less than about 4 minutes.

It is prepared by treating unspent, ZSM-5 used neat, with alkaline solutions of salts of weak acids.

DETAILED DESCRIPTION OF THE INVENTION

The unspent zeolites which may be used as reactants in the present process have a silica to alumina ratio of at least 70 and preferably higher. Although a zeolite of silica:alumina ratio of less than 30 was tested in accordance with the invention, the phenomon reported below was not observed for that zeolite. By unspent we mean that the activation described here does not reside in activating spent zeolite as described in Ser. No. 064,738 filed Jun. 22, 1987. In the preferred embodiment of the process, the silica:alumina mole ratio of the product zeolite is reduced, and thus is less than that of the reactant.

Furthermore, the process of the invention does not involve insertion or reinsertion of aluminum into the existing zeolite framework, as embraced by, e.g. U.S. Pat. No. 4,477,582. Thus, in accordance with the invention, the zeolite reactant used can be and is below, neat, and can be free of non-framework aluminum (alumina). Therefore, the word "neat" as used herein to characterize the reactant means that the reactant is free of binder comprising alumina.

The zeolite silica to alumina ratio referred to above is the ratio in the rigid anionic framework of the zeolite crystal, i.e. the structural or framework silica:alumina ratio and excludes materials such as aluminum in binder form or in another form within the channels of the zeolite.

The term "acidic" as used herein refers to any zeolite catalyst which is capable of inducing what is recognized in the art as an acid catalyzed reaction. Examples of acid catalyzed reactions include conversion of methanol to gasoline boiling range hydrocarbons, toluene disproportionation, xylene isomerization, benzene alkylation, cumene dealkylation, double bond shift, etc. As is known in the art, the acid catalytic activity of a zeolite may be measured by its "alpha value", which is the ratio of the rate constant of a test sample for cracking normal hexane to the rate constant of a standard reference catalyst. Thus, an alpha value of 1 indicates that the test sample and the reference standard have about the same activity. The alpha test is described in U.S. Pat. No. 3,354,078; in the *Journal of Catalysis*, Vol. IV, pp. 522-529 (August 1965), and in the *Journal of Catalysis*, Vol. 61, p. 395 (1980), each of which is incorporated herein by reference. Measurement of the alpha value is useful to quantify catalyst activity before treatment as well as the degree of activation achieved by the reactivation process of this invention. For this purpose, the zeolite is converted to the hydrogen form before evaluation. However, other types of conversion can also be used in the evaluation of catalytic activity and the zeolite need not always be in the hydrogen form.

The zeolite is also characterized by a Constraint Index which is within the approximate range of 1 to 12. The Constraint Index provides a convenient indication of the extent to which a zeolite provides access by molecules of differing sizes to the internal structure of the crystal through channels or pores, of the microporous crystalline aluminosilicate. A method for determining Constraint Index, together with values of the Index for Exemplary Zeolites is described in U.S. Pat. No. 4,016,218 and J. Catalysis 67, 218-222 (1981) to which reference is made for details of the method. Although Constraint Index is a characteristic which is dependent upon the structure of the zeolite, its measurement is via a test which is dependent upon the cracking or acid activity of the zeolite; accordingly, the test candidate should be representative of the zeolite in structure and have adequate cracking activity. Zeolites having a Constraint Index within the approximate range of 1 to 12 include ZSM-5, ZSM-11, ZSM-12, ZSM-23, ZSM-35, and ZSM-38. ZSM-5 is described in U.S. Pat. No. 3,702,886; ZSM-11 is described in U.S. Pat. No. 3,709,979; ZSM-12 is described in U.S. Pat. No. 3,832,449; ZSM-23 is described in U.S. Pat. No. 4,076,842; ZSM-35 is described in U.S. Pat. No. 4,016,245 and ZSM-38 is described in U.S. Pat. No. 4,046,859. These are the preferred zeolites and of these ZSM-5 is particularly preferred. Highly siliceous forms of ZSM-5 are described in U.S. Pat. No. Re. 29,948.

In a preferred embodiment, the reactant ZSM-5 has a sorption time for 30% of its sorption capacity for 2,2-dimethylbutane measured at 60° C. and P(2,2-dimethylbutane) of 60 torr of greater than four minutes. Moreover, the crystal size of the reactant ZSM-5 has a minimum dimension which exceeds 0.02 microns.

The method of the invention comprises treating a reactant zeolite with a solution which is alkaline under conditions to produce a ZSM-5 product having a framework silica:alumina mole ratio which is less than that of the reactant sample ZSM-5.

The alkaline aqueous medium has a pH greater than 7 and usually greater than 8, preferably at least about 10. Preferably, the alkaline aqueous medium is a solution of a salt of a weak acid. Exemplary of the anions of such weak acids are carbonate, borate, nitrate, silicate, phosphate, tungstate, chromate, aluminate, etc. The cation of the salt of the weak acid can be an alkali metal or an alkali earth metal. Useful alkali and/or alkaline earth metal cations are those including lithium, sodium, potassium, cesium, rubidium, calcium, magnesium, strontium and barium. Preferred are lithium, sodium, potassium, calcium, and magnesium. In solution, the molarity of the salt of the weak acid can broadly range from 0.1 to 5M; preferably, the molarity ranges from 0.1 to 1M. It is noted that, below, in addition to the salt of the weak acid, $NaNO_3$ is employed as a 0.6M solution; generally, when included, the molarity of $NaNO_3$ can range from about 0.5 to 1M. It appears that inclusion of $NaNO_3$ may increase activity of the product zeolite.

Treatment of the sample zeolite may be undertaken at ambient conditions of temperature and pressure. However, in preferred embodiments, that treatment is under hydrothermal conditions. An initial observation, under said hydrothermal conditions is the visible, at least partial, dissolution of the zeolite. Accordingly, the temperature can range from a temperature of from about 50° C. to the reflux temperature of the system, at autogenous pressures. Treatment of the reactant zeolite with the alkaline solution in accordance with the invention can be batchwise, continuous, and/or cyclic.

After hydrothermal treatment, the product zeolite can be converted to its protonated (acid) form by ion exchange with ammonium, followed by calcination.

Following treatment in accordance with the invention, it is necessary for use or for testing to reconvert the catalyst to the hydrogen form, e.g. employing the procedures of converting the zeolite to an intermediate ammonium form as a result of ammonium ion exchange followed by calcination to provide the hydrogen form. The operational requirements of these procedures are well known in the art and are outlined below.

Ion exchange of the crystalline silicate materials can be conducted to effect ammonium exchange at acidic sites of said materials. The source of the ammonium ion is not critical; thus the source can be ammonium hydroxide or an ammonium salt such as ammonium nitrate, ammonium sulfate, ammonium chloride and mixtures thereof. These reagents are usually in aqueous solutions; by way of illustration, aqueous solutions of 1N $NH_4OH$, 1N $NH_4NO_3$, 1N $NH_4Cl$ and 1N $NH_4Cl/NH_4OH$ have been used to effect ammonium ion exchange on these, and similar materials. The pH of the ion exchange is not critical but generally maintained at 7 to 12. Ammonium exchange may be conducted for a period of time ranging from about 0.5 to about 20 hours at a temperature ranging from ambient up to about 100° C. The ion exchange may be conducted in a single stage or in multiple stages. Calcination of the ammonium exchanged will produce the crystalline silicate or zeolite in its acid form. Calcination can be effected at temperatures up to about 600° C.

As noted above the product zeolite resulting from the process of the invention has diffusion properties different from those of the reactant zeolite and different from those heretofore described in the literature. Below in the examples reference is made to $t_{0.3}$, where $t_{0.3}$ is the characteristic diffusion time and is a measurement of the time it takes to sorb 30% of a material, e.g. o-xylene, by the rate constant determination described in U.S. Pat. No. 4,117,026, incorporated by reference herein as to that description. The characteristic diffusion time, $t_{0.3}$, is a direct measure of the critical mass transfer property $r^2/D$. And the diffusion rate constant is $$\frac{1}{t_{0.3}} \times 10^6 \text{ or } D/r^2 \times 10^6,$$

where $D$ = the diffusion coefficient (cm$^2$/sec) and $r$ = the crystal radius (cm).

The protonated form of the zeolite was subjected to TPAD, X-ray diffraction and sorption studies. Information gleened from these three tests indicated that the treated zeolitic material exhibited increased exchange capacity and enhanced catalytic activity (cracking activity) compared to the reactant zeolite sample. Moreover, X-ray diffraction and sorption studies with 2,2-dimethylbutane suggested that the crystal size of the zeolite was about 70 Angstroms or 34% of the size of the small ZSM-5 crystals, having dimensions ranging from 0.02 to 0.05 microns. The decrease in crystal size was confirmed from toluene disproportionation reactions in which para-xylene selectivity was decreased after treatment. Scanning electron micrographs revealed that very small particles of zeolite are formed as a result of the treatment.

In the case of many catalysts, it is desired to incorporate the zeolite hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the zeolite i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good physical strength, because in petroleum refinery processing, the catalyst is often subjected to conditions, which tend to break the catalyst down into powder-like materials which cause problems in processing.

Naturally occurring clays which can be composited with the hereby synthesized zeolite include the montmorillonite and kaolin families which include the sub bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite catalyst hereby prepared can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline silicate and inorganic oxide gel matrix vary widely with the crystalline silicate content ranging from about 0.1 to about 90 percent by weight, and more usually in the range of about 10 to about 70 percent by weight of the composite.

In general, organic compounds such as, for example, those selected from the group consisting of hydrocarbons, alcohols and ethers, are converted to conversion products such as, for example, aromatics and lower molecular weight hydrocarbons, over the catalytically active form of the composition of this invention by contact under organic compound conversion conditions including a temperature of from about 100° C. to about 800° C. a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 100; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 50; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons, e.g. gasoline, including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 1 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 50; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

The foregoing catalytic conversions are applications to which the class of medium pore zeolites have lent themselves. Of those foregoing conversions, the methanol to gasoline conversion is a good example of a reaction in which high activity ZSM-5 species with increased diffusion rate is desirable. The species prepared in the examples will catalyze the foregoing conversions. The catalyst species herein are best applied in catalytic conversions which require catalyst stability, improved aging characteristics, accompanied by high activity and increased diffusion rates; by increasing diffusion rates and decreasing shape selectivity; reduction in secondary reactions and in coking can be realized, with general overall catalyst aging improvements.

EXAMPLE 1

The catalysts used are as follows:

| Catalyst No. | 1 | 2 | 3 |
|---|---|---|---|
| Form | zeolite | extrudate | zeolite |
| $SiO_2/Al_2O_3$ | 880/1 | 70/1 | 2921/1 |
| Crystal size | 0.02–0.05 micron | 4.5 micron | greater than 0.5 micron |

A sample of ZSM-5 ($SiO_2:Al_2O_3 = 880$) was $N_2$ calcined, then air calcined at 538° C. with temperature programming of 1° C./min. The catalyst was then refluxed in $Na_2CO_3/NaNO_3$ (0.5M/0.6M) solution for 8 hours. Partial dissolution was observed. After 8 hours of reflux, less than 15% of the zeolite was recovered. Acidification of the filtrate produced 4.15 g of solid precipitate. Elemental analysis shows only 413 ppm $Al_2O_3$ present in the solid precipitate. The result clearly shows that silica is selectively removed from the zeolite after the $Na_2CO_3$ treatment under these conditions.

The treated material was ion-exchanged in excess 1N $NH_4NO_3$ solution at reflux for two hours. A second exchange with fresh $NH_4NO_3$ was then carried out at room temperature. The sample was washed and dried at 120° C. and calcined at 538° C. TPAD, XRD and 2,2-dimethylbutane sorption were performed on the recovered material. $NH_4+$ exchange capacity increases from 0.01800 meq/g ash to 0.5722 meq/g ash and alpha increases from 3 to 182.

The 2,2-dimethylbutane sorption experiments were conducted on a computer controlled duPont 951 Thermogravimetric Analyzer. The capacity measurements used for crystallinity measurements were made at 120° C. and P (2,2-dimethylbutane)=60 torr. Rate measurements were made at 60° C. under the same pressure.

The material has a sorption capacity for 2,2-dimethylbutane of 44.6 mg/g zeolite (78% of the untreated parent). However, the material shows very high 2,2-dimethylbutane diffusion rate. It has $t_{0.3}$ (time for obtaining 30% of zeolitic capacity) of 0.8 minutes. The estimated crystal size was 0.007 micron compared to 0.02 micron of the parent. Table 1 summarizes the results. A ZSM-5 sample of crystal size of 0.02 to 0.05 micron which has $t_{0.3}$ of about 7 minutes, was included for comparison.

Powder X-ray diffraction studies show that the crystallinity based on peak area measurement decreases to 78% of the untreated parent. This agrees with the crystallinity based on 2,2-dimethylbutane sorption. However, on some of the $Na_2CO_3$ activated samples the crystallinity measured by XRD was lower than calculated from the sorption measurement. The difference can be explained by very small crystals resulting from the treatment causing a lowering of X-ray intensity.

A sample of catalyst No. 2 extrudate was calcined and treated with the caustic solution for 20 hours following the above procedure. After $NH_4+$ exchanged and calcined, the catalyst was tested for toluene disproportionation at 455° C. and 450 psig with $H_2$/HC mole ratio of 2.74.

A sample catalyst No. 3 zeolite was converted to Na-form and then soaked in 0.5M $Na_2CO_3$ solution at 90° C. for 112 hours. The treated material was washed, calcined and examined by scanning electron microscopy.

FIG. 1 shows the rate of sorption for 2,2-dimethylbutane after the treatment. Crystal sizes were estimated to be about 0.007 micron based on calculations assuming a ZSM-5 to have a crystal size of 0.02 micron. This ultra-small crystal size agrees qualitatively with the XRD pattern, which shows broader peaks than ZSM-5 of crystal size of 0.02 to 0.05 micron.

The decrease in crystal size with carbonate treatment was confirmed using a treated 4.5 micron crystal size ZSM-5 containing extrudate via testing with the toluene disproportionation reaction. For toluene conversion of less than 40%, p-xylene selectivity is higher than o-xylene selectivity on that large (4.5 micron) crystal ZSM-5, the p-xylene/o-xylene ratio is greater than 1. After the treatment, the p-xylene selectivity decreased to equilibrium value.

Figure 2:
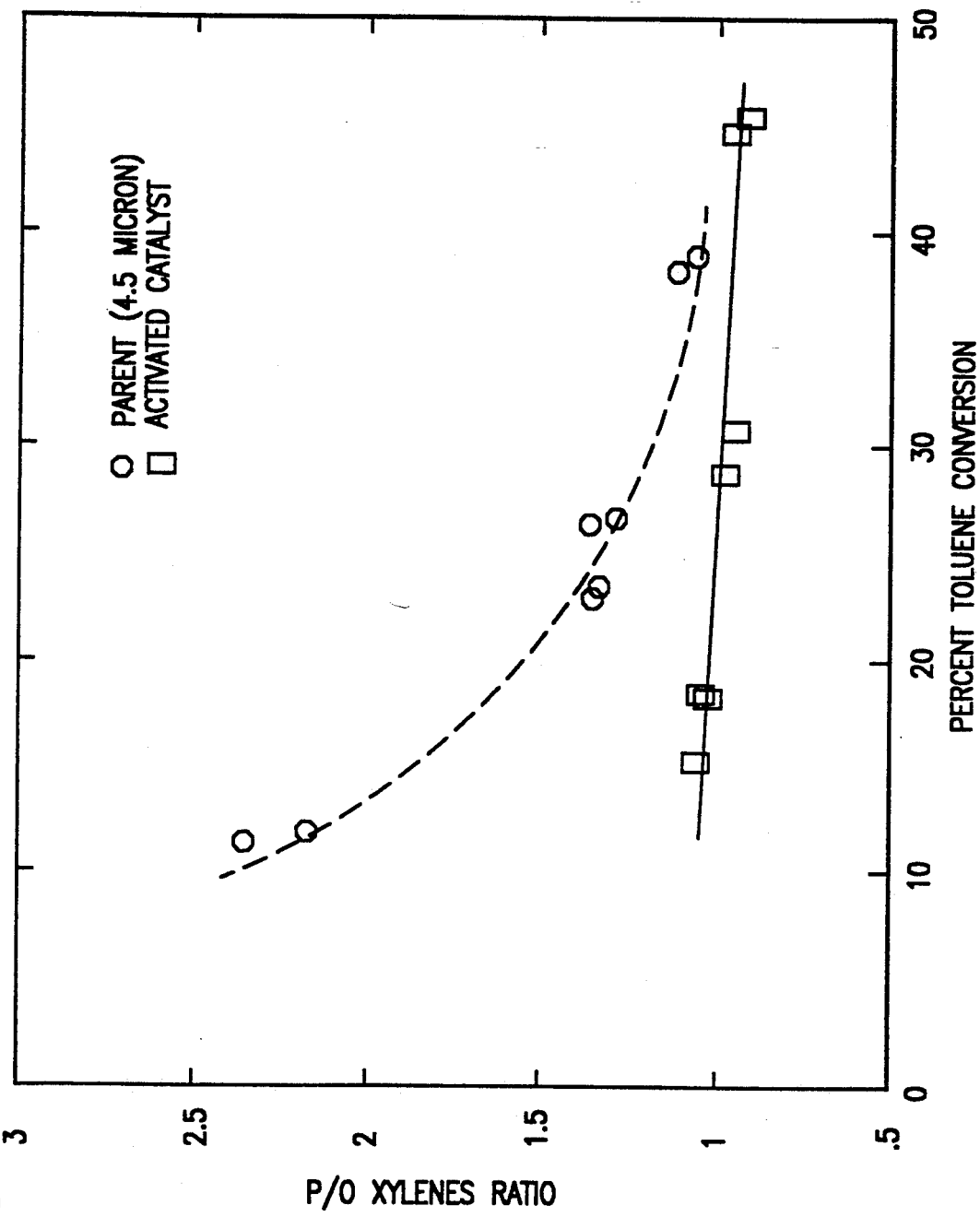
FIG. 2 is a graph of the plot of the ratio of p-xylene/o-xylene vs. percent toluene conversion.

FIG. 2 shows the p-xylene/o-xylene ratio obtained from the 4.5 micron catalyst and after the caustic treatment.

Figure 3:
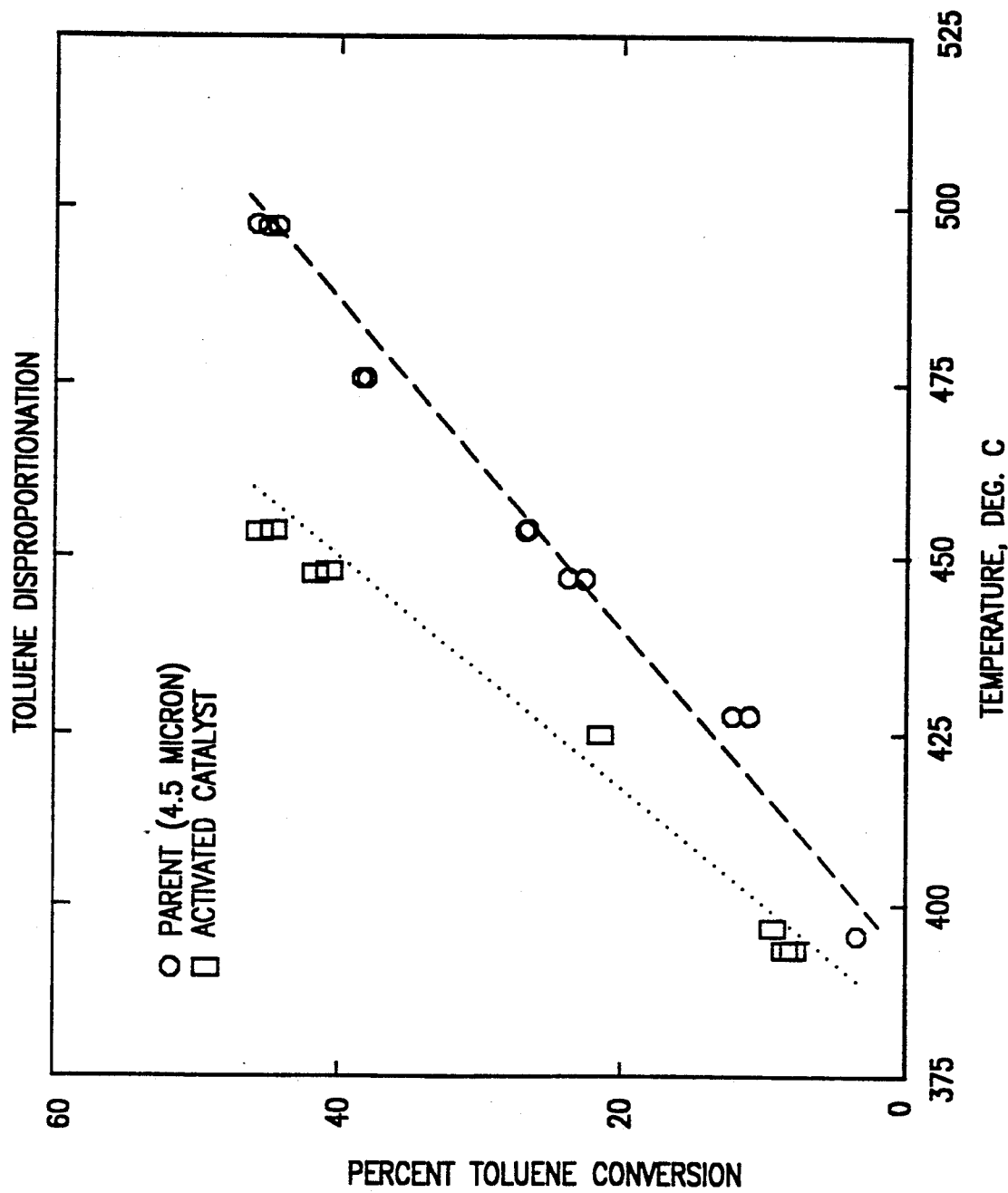
FIG. 3 is a graph of the plot of percent toluene conversion vs. toluene conversion temperature.

FIG. 3 shows the increase of activity after the treatment.

Scanning electron micrographs were taken on the super-large ZSM-5 crystals; the average length of the predominant large crystals is about 50 micron.

The dissolution of the silica results in less dense material with very uniform small particles. These small particles occur with highest density on the [101] surfaces of the large crystal, the end faces, being most densely packed. Each small particle is an aggregate of small crystals.

The formation of small particles agrees with the significant increase of the sorption rate for 2,2-dimethylbutane and lowering of the p-xylene selectivity in the toluene disproportionation reaction.

ZSM-5 zeolite treated with $Na_2CO_3$ solution resulted in selective removal of silica. The treated materials exhibit increased exchange capacities and enhanced catalytic activities. Scanning electron micrographs of the treated crystals revealed very small particles formed as a result of the treatment. This is consistent with the enhancement in sorption rate for 2,2-dimethylbutane, and decreased p-xylene selectivity in the toluene disproportionation. The crystal size was estimated to be about 0.007 micron (or 34% of the size of ZSM-5 crystals of 0.02 to 0.05 micron).

TABLE 1

| $Na_2CO_3$ Treatment on ZSM-5 zeolite ($SiO_2/Al_2O_3$ = 880) | | | |
|---|---|---|---|
| Catalyst of Example 1 | Reactant | Product | Comparison* |
| Treatment time (hr) | — | 8 | — |
| TPAD meq/g ash | 0.018 | 0.5722 | |
| $SiO_2/Al_2O_3$ | 880 | 56 | |
| Alpha | 2 | 180 | |
| XRD % | 100 | 78 | |
| 2,2-DMB sorp. cap. % | 100 | 78 | |
| 2,2-DMB rate at 60° C. $D/r^2$ (sec 1) × $10^4$ | 1.0 | 14.6 | 1.68 |
| Est. Crystal size micron | 0.026 | 0.007 | 0.02 |

*ZSM-5 of 0.02–0.05 micron crystal size.

EXAMPLE 2

A sample of ZSM-5 with $SiO_2/Al_2O_3$=70 was refluxed in $Na_2CO_3$ solution for 20 hours. The product was less than 80% crystalline (XRD).

EXAMPLE 3

A sample of ZSM-5 with $SiO_2/Al_2O_3$=26,000 was treated with aqueous $NaAlO_2$ at 150° C., autogenous pressure. The product was about 30% crystalline (XRD).

EXAMPLE 4

33.25 grams of an ZSM-5 (crystal size 0.05 to 0.02 micron) was first contacted with 1 liter of 0.5M sodium carbonate at reflux for 2 hours. After 2 hours at reflux, the resulting ZSM-5 material was washed with 1 liter of deionized water. The material was then dried under vacuum at 125° C. This step was repeated 5 additional times for 2,4.5,5,3.75 and 5 hours on the resulting material and used fresh sodium carbonate solution each time. The final weight recovered was 6.65 grams or a recovering of 20%. The recovered ZSM-5 was exchanged twice with 1M ammonium nitrate solution at room temperature. The activity of the exchanged ZSM-5 was measured by the Alpha test and determined to be 1. The starting material had an alpha value of 170. The sodium carbonate/ammonium nitrate material was reexchanged with ammonium nitrate solution whose pH was adjusted to 2 by addition of nitric acid. The activity of this material was now 340. STEM analysis of the final product clearly indicated that the central portion of the crystals had been removed by the carbonate treatment. What remained were walls of aluminum rich ZSM-5 and whose size were determined to be 50 to 100 angstroms. The silica/alumina ratio of the starting material was 70/1, while the treated material was 25.8/1. Table 2 relates various properties of the starting, ammonium nitrate, and ammonium nitrate/nitric acid samples.

TABLE 2

|  | PARENT | NH$_4$NO$_3$ | NH$_4$NO$_3$/HNO$_3$ |
|---|---|---|---|
| ELEMENTAL ANALYSIS | | | |
| SILICA, % | 85.4 | 69.0 | 81.7 |
| ALUMINA, % | 2.4 | 11.4 | 6.6 |
| SODIUM, % | NIL | 4.6 | 0.03 |
| AL NMR, PPM | 12,700 | 44,500 | 31,400 |
| TEMP PROGRAMMED DESORPTION | | | |
| MEQ/GRAM | 0.3453 | — | 1.2118 |
| SILICA/ALUMINA | 94.7/1 | — | 25.8/1 |
| TEMPmax | 379° C. | — | 384° C. |
| CRYSTALLINITY, XRAY | 100 | — | 79.2 |
| ACTIVITY, ALPHA | 170 | 1 | 340 |

Sorption measurements, using 2,2-dimethylbutane at 60° C., were made on the parent and base treated material. Based upon these measurements, $D/r^2$ values were calculated for the parent ($5 \times 10^{-5}$/sec) and the treated material ($2.78 \times 10^{-4}$/sec). From these values we conclude that the effective crystal size has been reduced by a factor of 2.4 by the base treatments.

What is claimed is:

1. A process for producing ultra small crystals of ZSM-5 consisting essentially of the steps of:
   (a) providing a sample consisting of an unbound, neat, fresh, and unspent ZSM-5 zeolite free of non-framework aluminum having
      (i) a framework silica:alumina mole ratio of at least 30:1,
      (ii) a crystal size at least 0.02 micron,
      (iii) a sorption time, $t_{0.3}$, of greater than four minutes, wherein $t_{0.3}$ is the time required to sorb 30% of the sorption capacity for 2,2-dimethylbutane measured at 60° C. and a partial pressure for 2,2-dimethylbutane of 60 torr;
   (b) contacting the sample under hydrothermal conditions, with a solution of alkali metal carbonate, said solution having a pH greater than about 8, said hydrothermal conditions being effective to remove framework silica from said zeolite to produce a product with a framework silica:alumina mole ratio less than that of the sample, an ion exchange capacity greater than that of the sample, and a $t_{0.3}$ value of less than about 4 minutes;
   (c) recovering said product of ultra small crystals of ZSM-5.

2. The process of claim 1, wherein step b) includes dissolving a portion of said sample.

3. The process of claim 2, wherein the alkali metal is selected from the group consisting of lithium, sodium, potassium, cesium, rubidium, and admixtures thereof.

4. The process according to claim 1, which further
   (d) includes ammonium ion exchanging the product to convert the zeolite product to its ammonium form, and wherein the ammonium exchange capacity of the product exceeds that of the sample.

5. The process of claim 4, wherein the alkali metal is selected from the group consisting of lithium, sodium, potassium, cesium, rubidium, and admixtures thereof.

6. The process of claim 5, wherein said hydrothermal conditions of step (b) include a temperature of at least about 50° C.

7. The process of claim 6, wherein said hydrothermal conditions include a temperature which is at the reflux temperature of the solution.

8. A process for increasing the diffusion rate of a ZSM-5 sample consisting essentially of the steps of
   providing a sample consisting of ZSM-5 having a silica:alumina mole ratio of at least about 30 and a crystal size of at least 0.02 micron;
   contacting said ZSM-5 with a 0.5 to 5M alkaline aqueous solution of sodium carbonate, under hydrothermal conditions effective to dissolve at least a portion of the sample and to produce an insoluble zeolite product wherein said product is ZSM-5;
   recovering the ZSM-5 product; and
   converting the ZSM-5 product to its protonated form, whereby the crystal size of the protonated product is less than 0.02 microns wherein the product exhibits the X-ray diffraction pattern of the sample.

9. The process of claim 7, wherein the silica:alumina mole ratio is at least 70.

10. The process of claim 8, wherein the ZSM-5 product has a silica:alumina ratio less than that of said sample.

11. The process of claim 8, which includes ammonium ion exchanging the product.

12. A process for producing ultra small crystals of ZSM-5 consisting essentially of:
   (a) providing a sample consisting of an unbound, neat, fresh, and unspent ZSM-5 zeolite free of non-framework aluminum, having
      (i) a framework silica:alumina mole ratio of at least about 70:1,
      (ii) a crystal size of at least about 0.02 micron,
      (iii) a sorption time, $t_{0.3}$, of greater than four minutes, wherein $t_{0.3}$ is the time required to sorb 30% of the sorption capacity for 2,2-dimethylbutane measured at 60° C. and a partial pressure for 2,2-dimethylbutane of 60 torr
   (b) contacting the sample under hydrothermal conditions with a solution of sodium carbonate, said solution having a pH greater than about 7, said hydrothermal conditions being effective to remove framework silica from said zeolite to produce a product with a framework silica:alumina mole ratio less than that of the sample, said product having an ion exchange capacity greater than that of the sample, and a $t_{0.3}$ value of less than 4 minutes;
   (c) recovering a first product ZSM-5 from said supernatant; and then repeating (b) and (c) to obtain a second ZSM-5 product.

13. The process of claim 12, wherein the second ZSM-5 product has a silica:alumina mole ratio less than that of the first product.

14. The process of claim 12 which further includes at least one additional repeat of (b) and (c).

* * * * *